Feb. 25, 1964  B. GROSS  3,122,640
METHOD AND APPARATUS FOR MEASURING THE
DOSAGE OF X-RAYS AND GAMMA RAYS
Filed May 13, 1960
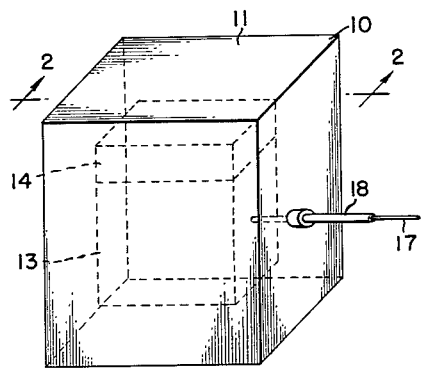
FIG. 1.
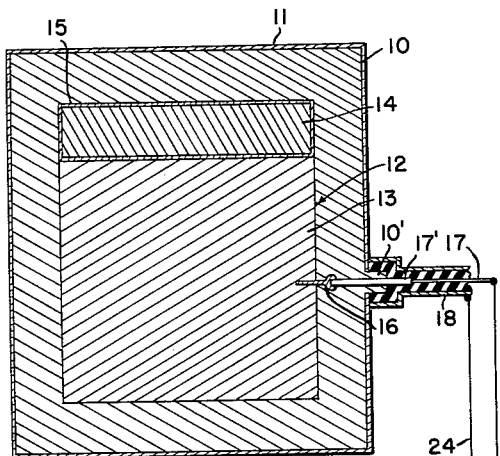
FIG. 2.
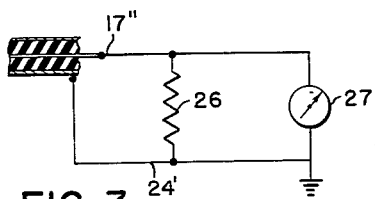
FIG. 3.
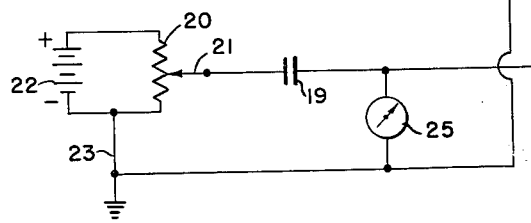
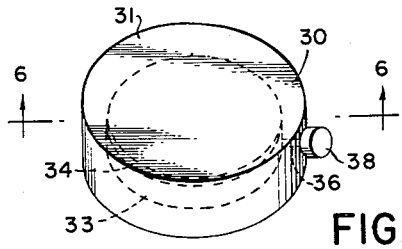
FIG. 5.
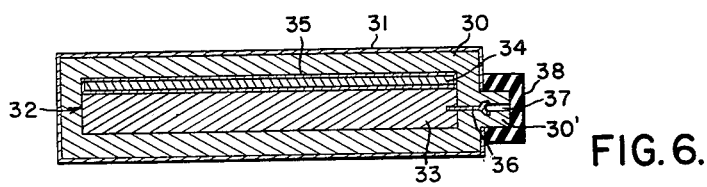
FIG. 6.
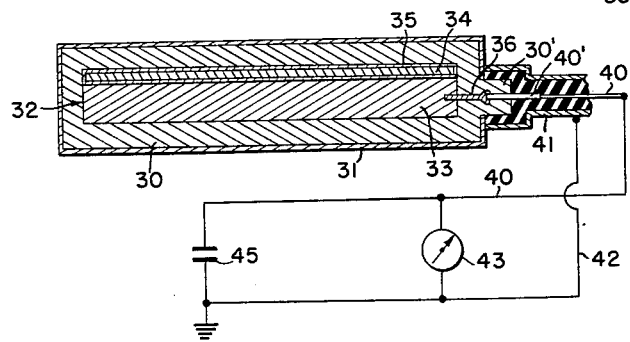
FIG. 7.
INVENTOR.
Bernhard Gross
BY
Garvey & Garvey
ATTORNEYS United States Patent Office 3,122,640
Patented Feb. 25, 1964

3,122,640
METHOD AND APPARATUS FOR MEASURING THE DOSAGE OF X-RAYS AND GAMMA RAYS
Bernhard Gross, 178 Rua Nascimento Silva, Rio de Janeiro, Brazil, assignor of one-half to Preston V. Murphy, Rio de Janeiro, Brazil
Filed May 13, 1960, Ser. No. 29,083
19 Claims. (Cl. 250—83.3)

This invention relates to a method and apparatus for measuring the dosage of X-rays and gamma rays from high intensity sources.

The radiation dosage of penetrating X-rays and gamma rays from high intensity sources has, in the past, been determined in a variety of ways, none of which has proven satisfactory. Ionization chambers are inadequate for very high doses and the determination of the incident energy flux from values given in roentgen is ambiguous for hard radiation. For these reasons, integral doses have been frequently measured with glass dosimeters, where the coloration produced by the absorbed radiation is measured with a photometer or with chemical dosimeters which allow determination of reaction products of photo-chemical reactions. Calorimetric methods have also been used for absolute dosimetry. Both the chemical and calorimetric methods have proven cumbersome in use and, with glass dosimeters, the fading of the coloration must be taken into account. These methods have the additional disadvantage that none of the devices can be used immediately after a measurement has been made.

It is an object of this invention to provide a method and apparatus for directly determining the dosage of hard X-rays and gamma rays by measuring the electrical current produced by radiation.

Another object is to measure the dosage of hard X-rays and gamma rays with a simple and rugged receiver upon which the rays impinge, the receiver being in circuit with a measuring instrument for determining the radiation dosage without use of an auxiliary voltage.

A further object is to provide a device of the character described in which the receiver comprises an outer scatterer of insulating material and an internal electrode within the scatterer, the internal electrode being adapted to receive Compton electrons produced in the scatterer by radiation.

Other objects of the invention will be manifest from the following description of the present preferred forms of the invention, taken in connection with the accompanying drawing wherein:

FIG. 1 is a perspective view of a radiation receiver constructed in accordance with the present invention;

FIG. 2 is an enlarged sectional view taken along the line 2—2 of FIG. 1 looking in the direction of the arrows, the radiation receiver being shown connected to an electrical measuring system, illustrated diagrammatically;

FIG. 3 is a diagrammatic showing of a modified form of electrical measuring system;

FIG. 4 is another modified electrical measuring system shown diagrammatically;

FIG. 5 is a perspective view of a modified form of radiation receiver constructed in accordance with the present invention;

FIG. 6 is an enlarged sectional view taken along the line 6—6 of FIG. 5 looking in the direction of the arrows; and FIG. 7 is a sectional view similar to FIG. 6, showing the receiver in electrical engagement with a measuring system.

The present invention generally comprises a receiver of simple but rugged construction and great mechanical resistance, which is exposed to radioactive rays. Radiation produces a current carried by secondary Compton electrons which is proportional to the incident radiant energy flux. Electrical measuring means in circuit with the receiver measure this current to give the integral dosage or, if desired, continually registering instruments can be employed. True absorption in the energy range between approximately 0.3 and 3 mev. is due mainly to the Compton effect. Photoabsorption occurs at lower energies and pair production at higher energies. The Compton electrons are scattered principally in the direction of the incident photon beam. A unidirectional photon beam, therefore, produces an electron current without application of an external electric field. Production of the electrons in an insulator permits the current to be measured. Measurability depends only on a sufficiently high radiation flux. The intensity of the electron current is a measure of the radiation flux.

The intensity of the current produced by a given radiation dose can easily be calculated approximately when the following suppositions are made: (1) Since the average Compton electron scattering angle is small for energetic gamma rays, it is assumed that the Compton electrons are scattered in the direction of the primary gamma rays. (2) The range of the electrons is small as compared with the average range of the corresponding primary radiation. (3) The electrons can be treated as particles having a definite range. (4) The energy distribution of Compton electrons produced by monoenergetic photons can be approximated by an average energy. (5) Photoeffect and pair production can be neglected.

The energy flux of a photon beam $P(x)$ (in erg/sec.) decreases by true absorption $dP_1/dx$ and by scattering $dP_2/dx$. The average energy of the produced Compton electrons shall be $E$(erg) and $N(x)$ shall be the total number of electrons produced at depth $x$ per unit length and unit time; $N(x)$ is measured in cm.$^{-1}$ sec.$^{-1}$.

The energy which the primary beam loses by true absorption equals the energy of the Compton electrons. Therefore, $$dP_1/dx = -N(x)E$$

Let $n(x)$ be the number of electrons going through a cross section of the irradiated material per unit time. $n(x)$ is equal to the total number of electrons produced within one range distance R.
Thus $$n(x) = RN(x)$$

The relation between range and energy within the given energy interval will be considered to be linear, i.e.

$$R = aE$$

where $a$ is a constant of proportionality. It follows now that $$n(x) = aEN(x)$$

The total current is given by total number of electrons times unit electron charge $e$, where $e$ is given in coulombs. If $q$ is the cross section in cm.$^2$, the current density in amp./cm.$^2$ is given by $$i(x) = -(i/q)eadP_1/dx$$

Monocromatic radiation is absorbed according to an exponential law. If $m$ is the linear absorption coefficient in cm.$^{-1}$, one has $dP_1/dx = -mP$, and finally $$i(x) = eamP/q$$

The current is proportional to the incident radiant energy flux. Therefore, it can be used for dose determinations.

The true current intensity is smaller than the calculated one because the Compton electrons are scattered not exclusively in the direction of the primary photons but suffer also wide angle and back scattering. These effects decrease with increasing primary energy. Therefore, with increasing photon energy the true current intensity will approach more and more the calculated values.

The true absorpton coefficient has a flat maximum around 0.5 mev. As an example we indicate approximate values for Al:

| Photoenergy (mev.) | 0.25 | 0.4 | 0.6 | 1 | 2 | 3 |
|---|---|---|---|---|---|---|
| Absorption coefficient (per g./cm.²) | 0.028 | 0.3 | 0.3 | 0.26 | 0.23 | 0.2 |

The sharpness of the maximum increases with increasing atomic number of the scattering material. For measurement purposes, materials with a flat maximum are selected because they give the smaller energy dependance.

The global change of sensitivity with energy is determined by a superposition of the two above-mentioned effects: The scattering effect makes the sensitivity increase with energy; the variation of the true absorption coefficient decreases the sensitivity with increase of energy above approximately 0.5 mev. The result can be a nearly constant sensitivity curve in a wide range of energies.

The relation between Compton effect and photoelectric effect at a given energy depends on the material. It is, of course, preferred that the scatterer be made of a material in which the Compton effect begins to take place at the lowest possible energy. One example of such a substance is Lucite.

Referring now to the drawing and in particular to FIGS. 1 and 2, the device of the present invention comprises a radiation receiver of box-like conformation including an outer scatterer 10 of insulating material, such as Lucite, Plexiglas, Mylar, polystyrene, quartz or special glass. As shown in FIG. 2, the entire external surface of the scatterer is covered by a conducting layer 11 of Aquadag aluminum coating, metal foiling, or any other suitable material, which is grounded. Within the insulated scatterer is a central electrode 12 which is preferably positioned equidistant from the peripheral limits of scatterer 10. For optimum results, central electrode 12 includes a lead absorber 13 superjacent to which is a collector 14 made of Lucite or any other suitable material of low atomic number. The entire outer surface of collector 14 is covered by a conducting layer 15 made of the same substance as conducting layer 11. Since an insulator with a conducting surface behaves as a Faraday cage, i.e., like a metal, the entire amount of electrical charge entering both the scatterer and collector appears as surface charges. Therefore, electrically, collector 14 and absorber 13 act as a single electrode. Collector 14 functions to collect incoming Compton electrons under conditions in which the backscattering of electrons is minimized and absorption of the backscattered photons from the lead absorber occurs.

The dimensions of the lead absorber are determined by the energy of the incident radiation and the cross section of the ray beam. As an example, the total attenuation coefficient of lead for 1.26 mev. gamma rays from a cobalt 60 source is approximately 0.06 cm.²/g. and for a 90% absorption of the incoming radiation, 77 g./cm.² of lead is needed, i.e., a thickness of the lead absorber of 6.8 cm. The cross section of the absorber must be large enough to absorb the side scattered photons. If the cross section of the incoming beam is, for example, 4 x 4 cm., the absorber cross section will be approximately 10 x 10 cm.

Scatterer 10, on the other hand, must be thick enough to insure adequate insulation under the most adverse conditions under which the system will operate. Therefore, it must be able to withstand exposure to very intensive gamma radiation, which is well known, to increase the conduction of all insulators considerably. Plastic insulating material, such as Plexiglas and polystyrene of 0.5 to 1 cm. thickness, have been found to be adequate for this purpose. Plastics exposed to very extensive radiation suffer permanent modifications of structure which eventually impair their insulation properties. For this reason, inorganic insulators, such as quartz, special glass (Pyrex or borosilicate glass), can be employed if extreme conditions of radiation are expected. Scatterer 10 completely covers central electrode 12 to avoid charge leakage through the ionized air.

The photon beam undergoes some attenuation in its passage through scatterer 10. In an insulated scatterer made of Lucite of one cm. thickness, this attenuation is approximately 6%. Accordingly, the current in the scatterer is not constant but decreased by the same amount. The device of the present invention measures the average current intensity in the scatterer. The necessary correction of the measured values is, therefore, smaller and can be calculated with sufficient accuracy.

In connection with the radiation receiver of the present invention, there is provided an electrical measuring system for determining radiation by a zero method. For this purpose, a portion of scatterer 10 is extended beyond one side of the receiver to form a boss 10' at the locus of a measuring electrode 16. A coaxial cable including a central conductor 17 having a probe 17' in connection with electrode 16 is engaged with boss 10'. The outer shield 18 of the coaxial cable is in electrical contact with conducting layer 11. In accordance with this method, the charge of the measuring system is compensated by a counter-voltage applied across a capacitance. The compensation capacitor is designated 19. This counter-voltage is obtained from a potentiometer 20 having a sliding contact 21, the potentiometer being energized by a battery 22, the negative pole of which is grounded through ground conductor 23. A ground wire 24 extends from coaxial shield 18 to the ground. A voltmeter 25 connected across lines 17 and 24 indicates the value of the compensation voltage. By this arrangement, the voltage of the measuring electrode is kept as near to zero as possible and the speed of increase of the counter-voltage is a measure for the current.

The external electrode is, therefore, connected with sliding contact 21 of the potentiometer system. If C is the capacitance of capacitor 19 which must be much higher than that of the measuring electrode so that the latter might be neglected, the current I is determined by the formula:

$$I = C\,dV/dt$$

where V is the counter-voltage (potential of the slider). The quantity $dV/dt$ can either be calculated from a measurement of V against time or directly registered with the aid of an electrical differentiating circuit. The value of the total radiant energy over the given time or of the integral dose is given by a measurement of the total charge over the same interval of time.

In FIGS. 3 and 4 there are shown alternative measuring systems. In the system shown in FIG. 3, the current flowing through line 17" across a high ohm resistor 26 and the voltage drop between line 17" and ground line 24' is measured by a voltmeter 27. In this system the capacity might, however, be quite considerable. It depends mainly on the length of the coaxial cable which leads from the radiation site to the measuring room. The time constant $T = RC$ of the system should be kept below about 10 seconds to avoid sluggishness of the electrical system.

In the measuring system illustrated in FIG. 4, the current flows through a line 17''' and charges a capacitor 28. The slope of the voltage-time curve is measured or registered by a voltmeter 29. A ground line is indicated at 24".

The apparatus illustrated in FIGS. 1 to 4, minimizes as far as possible all sources of error and allows precision measurements. However, the volume and weight of the system become considerable and, consequently, are suitable only for stationary equipment, possibly in connection with an automatic registering device and capable of use in actual measurements.

In FIGS. 5, 6 and 7, there is illustrated a modified form of the present invention in which a small portable apparatus is employed which will give relative measurements and, because of its smallness, must be calculated by a comparison method.

In this form of the invention the radiation receiver is of substantially disc-shape and includes a scatterer 30, the entire external surface of which is covered by conducting layer 31. An internal electrode is indicated at 32 which preferably comprises a lead absorber 33 and a collector 34. A conducting layer 35 covers the external surface of collector 34. A measuring electrode is indicated at 36. The component parts of the portable apparatus are constructed of the same material as set out above in connection with the form of invention illustrated in FIGS. 1 to 4.

As shown in FIG. 6, a portion of scatterer 30 extends beyond the side wall of the receiver at the locus of measuring electrode 36 to form a boss 30' having a central recess 37 in communication with electrode 36. Boss 30' is normally covered by a cap 38 made of any suitable insulating material. In this form of the invention, the receiver is irradiated while cap 38 is engaged with boss 30'. Accordingly, the central electrode system is electrically charged against the conducting external electrode. After irradiation, the charge of the central system is measured by removing cap 38, grounding the external electrode, and connecting central electrode to a suitable charge or potential measuring device. The measuring circuit is shown in FIG. 7 and includes a coaxial cable which is engaged with boss 30'. The coaxial cable includes an inner conductor 40, one terminal of which issues into a probe 40' adapted to be received in recess 37, which probe is electrically connected with measuring electrode 36. The cable also includes an outer shield 41 which is in electrical contact with conducting layer 31. A ground line is indicated at 42. A system electrometer 43, and capacitor 45 are positioned across lines 40 and 42. With the portable device of the present invention, the capacitance of the central electrode is relatively small. A device constructed in accordance with this teaching has a capacitance of 100 micromicrofarads. A current of $10^{-10}$ amperes produces, in 100 seconds, a voltage of 100 volts. Such voltages can be measured with simple fiber electrometers which are commonly used in connection with pocket ionization chambers. It will also be noted that this is a batteryless measuring system. Instead of a fiber electrometer a small valve voltmeter, customarily employed for measurements with thimble ionization chambers, may be used. The higher sensitivity of these voltmeters allows measurements of much smaller voltages and, therefore, considerably increases the overall sensitivity. However, the sensitivity of the device might also be arbitrarily decreased by a capacitor connected in parallel with the measuring electrode. The capacitor would have to be protected by a lead chamber.

It is pointed out that in both forms of the present invention there is illustrated a collector which forms part of the internal electrode, which collector has been found to produce optimum results in the operation of the radiation receiver. However, it is understood that, if desired, the collector may be eliminated, in which case its function is assumed by the lead absorber. Various other changes may be made within the scope of the claims hereto appended.

What is claimed is:

1. A method of measuring the dosage of X-rays, and gamma rays which comprises irradiating a receiver including an insulator, and directly measuring the flow of electrons in the insulator produced by the Compton effect by the irradiation.

2. A method of measuring the dosage of X-rays and gamma rays, as set out in claim 1, wherein the voltage produced by the Compton effect in the insulator of the receiver is electrically measured without the use of an external potential source.

3. A method of measuring the dosage of X-rays and gamma rays, as set out in claim 1, wherein the charge of Compton electrons produced in the insulator is measured.

4. A method of measuring the dosage of X-rays and gamma rays, as set out in claim 1, wherein the current carried by the Compton electrons is measured.

5. Apparatus for measuring the dosage of X-rays and gamma rays, comprising a radiation receiver including a central electrode, a scatterer of insulating material covering the central electrode, an external electrode covering the scatterer, means for grounding the external electrode, and means for measuring the flow of Compton electrons produced in the scatterer by irradiation of the receiver.

6. The apparatus of claim 5, wherein said means for measuring the flow of Compton electrons includes an electrical meter in circuit with the receiver.

7. The apparatus of claim 5, wherein the scatterer is made of a material having a high ohmic resistance, a flat maximum of the true absorption coefficient for X-rays, and a low threshold for the inception of the Compton effect.

8. The apparatus of claim 5, wherein the central electrode comprises two component parts, one of said parts being an absorber, said other part being a collector composed of an insulating material covered on all of its external surfaces by a conducting layer.

9. The apparatus of claim 5 wherein the absorber is made of a metal of high atomic number, the dimensions of which absorber are predetermined to effect maximum absorportion of the photon beam.

10. The apparatus of claim 5, wherein the means for measuring the flow of Compton electrons includes meter means for measuring the current flow in the central electrode produced by radiation of the receiver.

11. The apparatus of claim 5 wherein the means for measuring the flow of Compton electrons includes meter means for measuring the voltage in the central electrode produced by radiation.

12. The apparatus of claim 5 wherein the means for measuring the flow of Compton electrons comprises a capacitor in circuit with said central electrode, continuously changing voltage means connected to the capacitors and a high impedance zero detector in circuit with the central electrode.

13. The apparatus of claim 5 wherein the radiation receiver is portable and the means for measuring the flow of Compton electrons is detachable from the radiation receiver during irradiation of the latter.

14. The apparatus of claim 13, a portion of said scatterer being extended beyond the outer limit of said receiver to form a boss, and an insulated cap engageable with said boss when the receiver is irradiated.

15. Apparatus for measuring the dosage of X-rays and gamma rays comprising a radiation receiver embodying a central electrode including an absorber made of a metal of high atomic number and a collector, said collector being an insulating substance covered on all its external surfaces by a conducting layer, a scatterer of insulating material covering the central electrode made of a material having a high ohmic resistance, a flat maximum of the true absorption coefficient for X-rays and a low threshold for the inception of the Compton effect, an external electrode comprising a conducting layer covering the external surface of the scatterer, a measuring electrode extending from said central electrode to said scatterer, means for grounding the external electrode, and electrical meter means in circuit with said measuring electrode for measuring the flow of Compton electrons produced in the scatterer by irradiation of the receiver.

16. The apparatus of claim 15, wherein said means for measuring the flow of Compton electrons includes an electrical meter in circuit with the receiver.

17. The apparatus of claim 15, wherein the means for measuring the flow of Compton electrons includes meter means for measuring the voltage in the central electrode produced by radiation.

18. The apparatus of claim 15, wherein the means for measuring the flow of Compton electrons comprises a capacitor in circuit with said central electrode, continuously changing voltage means connected to the capacitor, and a high impedance zero detector in circuit with the central electrode.

19. The apparatus of claim 15, wherein the radiation receiver is portable and the means for measuring the flow of Compton electrons is detachable from the radiation receiver during irradiation of the latter.

References Cited in the file of this patent

UNITED STATES PATENTS

| | | |
|---|---|---|
| 2,696,564 | Ohmart | Dec. 7, 1954 |
| 2,745,284 | Fitzgerald et al. | May 15, 1956 |
| 2,760,078 | Youmans | Aug. 21, 1956 |
| 2,801,389 | Linder | July 30, 1957 |
| 2,830,185 | Scherbatskoy | Apr. 8, 1958 |
| 2,847,585 | Christian | Aug. 12, 1958 |
| 2,885,562 | Marinace et al. | May 5, 1959 |
| 2,934,652 | Caldwell et al. | Apr. 26, 1960 |
| 2,942,110 | Lehovec | June 21, 1960 |
| 2,968,731 | Davis et al. | Jan. 17, 1961 |
| 3,022,424 | Anton | Feb. 20, 1962 |
| 3,067,331 | Hess | Dec. 4, 1962 |

OTHER REFERENCES

Radiation Dosimeter, by Hine et al., Academic Press, New York, 1956, pages 76 to 86.

Rate Measurements, by Talmuty, Nucleonics, vol. 17, No. 10, October 1959, pages 66 and 67.